United States Patent
Morris

(10) Patent No.: US 8,042,137 B2
(45) Date of Patent: *Oct. 18, 2011

(54) CONTINUOUS SELECTION GRAPHS

(75) Inventor: Ronald A. Morris, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/819,624

(22) Filed: Jun. 21, 2010

(65) Prior Publication Data

US 2010/0257563 A1   Oct. 7, 2010

Related U.S. Application Data

(63) Continuation of application No. 11/818,490, filed on Jun. 14, 2007, now Pat. No. 7,765,571.

(51) Int. Cl.
*H04N 5/445* (2011.01)
*G06F 3/00* (2006.01)
*G06F 13/00* (2006.01)

(52) U.S. Cl. .............. 725/52; 725/44; 725/45; 725/61

(58) Field of Classification Search .............. 725/45, 725/46, 52, 61, 44
See application file for complete search history.

(56) References Cited

U.S. PATENT DOCUMENTS

| | | | |
|---|---|---|---|
| 5,945,988 A | 8/1999 | Williams et al. | |
| 6,064,385 A | 5/2000 | Sturgeon et al. | |
| 6,237,022 B1 | 5/2001 | Bruck et al. | |
| 6,795,536 B1 | 9/2004 | Ronca | |
| 7,024,424 B1 | 4/2006 | Platt et al. | |
| 7,143,364 B1 | 11/2006 | Tam et al. | |
| 7,254,829 B1* | 8/2007 | Brown et al. | 725/141 |
| 7,454,775 B1 | 11/2008 | Schaffer et al. | |
| 7,590,948 B2* | 9/2009 | Narita et al. | 715/810 |
| 7,765,571 B2 | 7/2010 | Morris | |
| 7,818,688 B2* | 10/2010 | Narita et al. | 715/841 |
| 2003/0061618 A1* | 3/2003 | Horiuchi et al. | 725/87 |
| 2005/0022240 A1* | 1/2005 | Ueda et al. | 725/46 |
| 2006/0026048 A1 | 2/2006 | Kolawa et al. | |
| 2006/0036752 A1 | 2/2006 | Iei et al. | |
| 2006/0271955 A1* | 11/2006 | Saito et al. | 725/45 |
| 2007/0136756 A1* | 6/2007 | Ishida et al. | 725/46 |
| 2007/0186243 A1 | 8/2007 | Pettit et al. | |
| 2008/0271078 A1 | 10/2008 | Gossweiler et al. | |
| 2008/0313673 A1 | 12/2008 | Morris | |
| 2009/0077589 A1 | 3/2009 | Boyer et al. | |
| 2010/0054703 A1* | 3/2010 | Tanaka et al. | 386/95 |

OTHER PUBLICATIONS

Kawai, Y et al., "My Portal Viewer for Content Fusion Based on userapos;s Preferences", *IEEE International Conference on Multimedia and Expo*, vol. 3, Issue 27-30, Abstract of article,(Jun. 2004), 1 page.

(Continued)

*Primary Examiner* — Kristine Kincaid
*Assistant Examiner* — Chris Parry

(57) ABSTRACT

A continuous selection graph can be displayed as a graphical user interface, where the continuous selection graph includes a similarity continuum to indicate media content that is progressively similar, and includes an axis of identifying criteria for the media content. The axis of identifying criteria for the media content associates the media content along the similarity continuum, where the axis of identifying criteria is displayed perpendicular to the similarity continuum.

20 Claims, 5 Drawing Sheets

OTHER PUBLICATIONS

Pogacnik, M. et al., "User modeling based on TV anytime metadata standard", *The IEEE Region 8 EUROCON*, (Sep. 2003),pp. 30-34.

Zhou, et al., "A Graph-matching approach to Dynamic media allocation in intelligent multimedia interfaces", *Proceedings of the 10th international conference on Intelligent user interfaces, ACM Press*, NY, USA., 114-121, (2005).

Rafter, Rachael et al., "Item Selection Strategies for Collaborative Filtering", *International Joint Conference on Artificial Intelligence*, (2003),pp. 1437-1439.

"Non-Final Office Action", U.S. Appl. No. 11/818,490, (Oct. 15, 2009),16 pages..

"Notice of Allowance", U.S. Appl. No. 11/818,490, (Apr. 5, 2010),9 pages.

\* cited by examiner

CONTINUOUS SELECTION GRAPHS

RELATED APPLICATION

This application is a continuation of and claims priority to U.S. patent application Ser. No. 11/818,490 filed Jun. 14, 2007 entitled "Continuous Selection Graphs" to Morris, the disclosure of which is incorporated by reference herein in its entirety.

BACKGROUND

Viewers have an ever-increasing selection of television programming to choose from, and may want to locate programming choices that are of interest to them. In addition to scheduled television program broadcasts, television viewing options also include on-demand choices which enable a viewer to search for and request media content for viewing when convenient rather than at a scheduled broadcast time. Typically, a viewer can initiate a search for a list of television programming choices and on-demand viewing choices in a program guide (also commonly referred to as an electronic program guide or "EPG"). The program descriptions shown in a program guide, however, are displayed in a single dimension and rarely provide enough information for a viewer to decide whether a program or movie will be of interest to them.

In other television programming and/or menu search systems, a viewer may select a genre or program category by which to locate particular types of programs and movies that may be of interest to them. Alternatively, a viewer may designate a particular actor as a basis to locate television programs and/or movies in which the actor appears. However, these types of program category search systems also initiate a search for programs of interest and return viewing options in a single dimension.

SUMMARY

This summary is provided to introduce simplified concepts of continuous selection graphs. The simplified concepts are further described below in the Detailed Description. This summary is not intended to identify essential features of the claimed subject matter, nor is it intended for use in determining the scope of the claimed subject matter.

In embodiments of continuous selection graphs, a continuous selection graph can be displayed that includes a similarity continuum to indicate media content that is progressively similar. The continuous selection graph can also include an axis of identifying criteria for the media content by which to associate the media content along the similarity continuum. Similar media content that is associated with the identifying criteria can be determined, and selectable indicators of the similar media content can be displayed to indicate a relationship between the identifying criteria and the similar media content along the similarity continuum.

In other embodiments, a television client system can include a graphical user interface that displays a continuous selection graph which includes a similarity continuum to indicate television programs that are progressively similar. The continuous selection graph also includes an axis of identifying criteria for the television programs by which to associate the television programs along the similarity continuum. A recommendation system module of the television client system can determine the television programs that are each associated with the identifying criteria. Selectable indicators of the television programs can be displayed on the graphical user interface to indicate a relationship between the identifying criteria and the similarity of the television programs. A selectable indicator of a television program can be displayed to indicate that the television program has either a more similar relationship to a selected content basis or a less similar relationship to the selected content basis along the similarity continuum.

In other embodiments, a continuous selection graph can be displayed as a circular graph where the axis of the identifying criteria for the media content is perpendicular to the similarity continuum. Further, the continuous selection graph can be implemented such that the similarity continuum horizontally intersects the circular graph and the axis vertically intersects the circular graph. Alternatively, or in addition, a continuous selection graph can include at least an additional axis corresponding to additional identifying criteria of the media content. The continuous selection graph can then be displayed as a spherical graph.

BRIEF DESCRIPTION OF THE DRAWINGS

Embodiments of continuous selection graphs are described with reference to the following drawings. The same numbers are used throughout the drawings to reference like features and components.

DETAILED DESCRIPTION

Embodiments of continuous selection graphs provide a visual graph by which viewers can locate similar media content, such as television programs and movies, based on user preferences. Viewers often may not know that a particular movie is available that would be of interest to them, yet the viewers will know which movies and/or programs they have previously watched and liked. A continuous selection graph can help viewers locate new movies, television programs, or any other type of media content that they did not previously know about. Additionally, a continuous selection graph can help a viewer locate cataloged or organized media content, such as from a video library, a collection of family photos, video-clips, user contacts in a communication system, and any other type of media content.

The user preferences for a continuous selection graph can include a content basis, such as a previously watched movie that a viewer selects as the starting point by which to locate other similar movies. In addition, the user preferences can include identifying criteria of the movies, such as descriptive information or attributes found in metadata that is associated with the particular movies.

Unlike a conventional program guide that displays television programming choices in a single dimension, a continuous selection graph provides a continuum of similar media content choices based on any number of various attributes of the metadata and/or other programming associated information. In addition, combinations of metadata attributes and/or other associated information can be selected by a viewer as the identifying criteria of a continuous selection graph.

While features and concepts of the described systems and methods for continuous selection graphs can be implemented in any number of different environments, computing systems, entertainment systems, and/or other various configurations, embodiments of continuous selection graphs are described in the context of the following example systems and environments.

Figure 1:
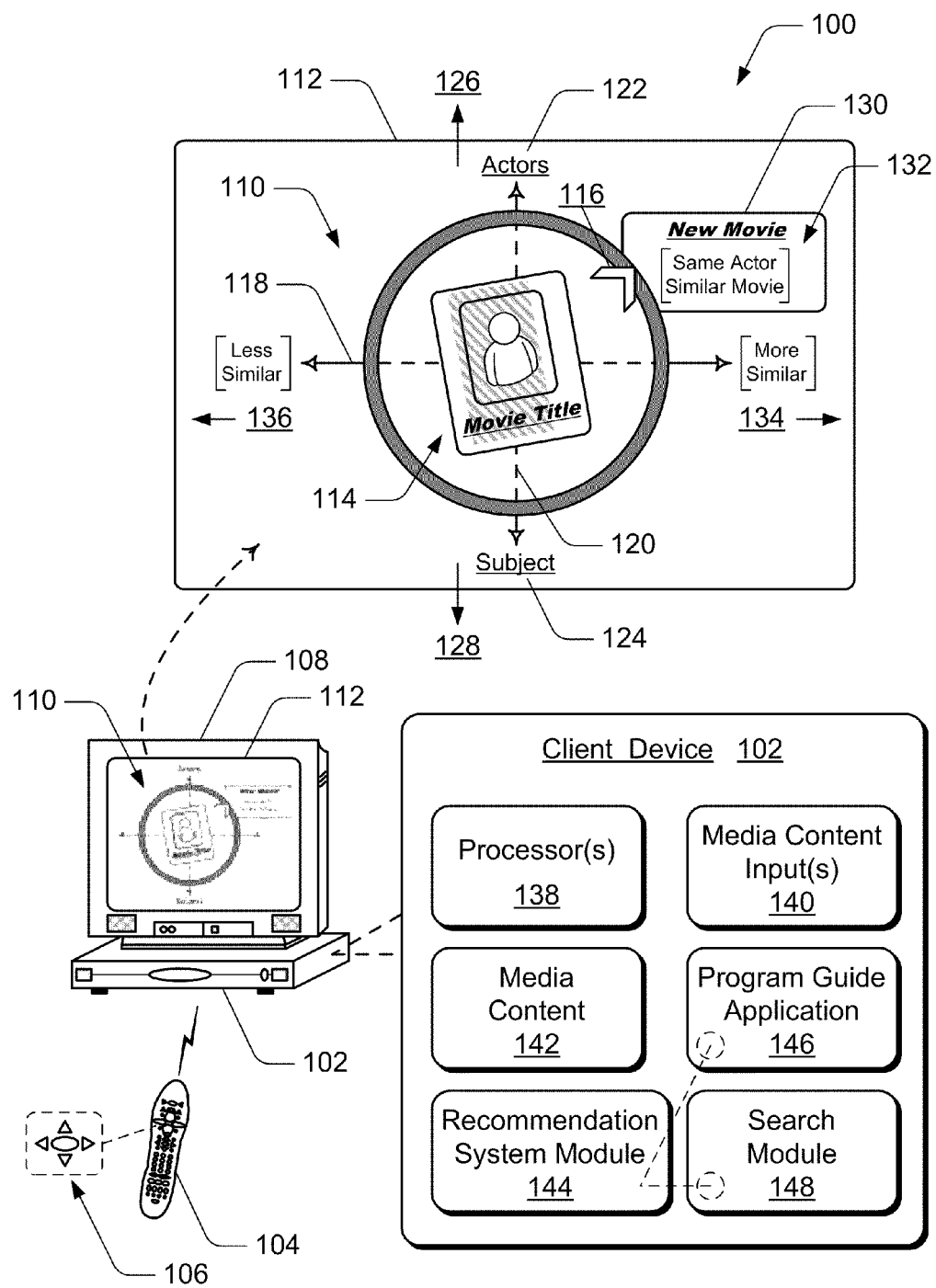
FIG. 1 illustrates an example system in which embodiments of continuous selection graphs can be implemented.

FIG. 1 illustrates an example system 100 in which various embodiments of continuous selection graphs can be implemented. The system 100 includes a client device 102 and a remote control device 104 that has selectable controls 106 for user interaction with the client device. System 100 also includes a display device 108 having an embodiment of a continuous selection graph 110 displayed on a graphical user interface 112. The display device 108 can be implemented as any type of television, LCD, or similar television-based display system that renders audio, video, and/or image data.

In this example, the continuous selection graph 110 is a circular graph implemented such that a viewer can find and select media content that is similar to a content basis 114. The content basis 114 can be a viewer selection, a recommendation system selection, a determination selected from a program viewing history, or any other type of starting point from which similar media content can be determined. A viewer can select the content basis 114 as a television program or movie that the viewer has watched and is interested in finding additional programs or movies that have a similar feature or aspect. Here, the content basis 114 is a currently selected movie and is shown as a movie page that includes text, graphics, and/or images for a movie. A viewer can then find other movies that are similar to the content basis 114.

Media content describes and can include programs (or programming) which may be any form of television programs, movies, commercials, music, and video on-demand media content. Other media content can include interactive games, network-based applications, music streamed from a computing device to the client device 102, as well as any other audio, video, and/or image content received from any type of content distributor or media content source. In a home or user environment, media content can also describe and include home media or video, saved video clips, cataloged family pictures, and the like.

A viewer can move a cursor 116 around the circle of the continuous selection graph 110 with user inputs via the selectable controls 106 of the remote control device 104. As the cursor 116 is moved around the graph, other movies or media content that is closer to or farther away from the currently selected movie (e.g., the content basis 114) become selectable on the user interface 112. The continuous selection graph 110 includes a similarity continuum 118 and another axis 120 of identifying criteria 122 and 124 by which to associate media content along the similarity continuum 118. In this example, the axis 120 of the identifying criteria 122 and 124 is perpendicular to the similarity continuum 118. Further, the similarity continuum 118 horizontally intersects the circular graph 110 and the axis 120 vertically intersects the circular graph 110.

The identifying criteria 122 and 124 can be any viewer-selectable criteria that describes or is otherwise associated with media content, such as metadata that may be associated with various types of media content to describe and categorize the media content. The metadata associated with a television program or movie can be any form of information that describes and/or characterizes the program or movie. For example, metadata can include a program or movie identifier, a title, a subject description of the program or movie, a plot description, actor information, a date of production, broadcast channel, television network, artistic information, music compilations, and any other possible descriptive information about the program or movie. Further, metadata can characterize a genre that describes the media content as being a movie, a comedy show, a sporting event, a news program, a sitcom, a talk show, an action/adventure program, or as any number of other category descriptions.

Any of the identifying criteria 122 and/or 124 can be optionally selectable by a viewer to provide a basis by which to locate movies or programs (e.g., other media content) that may be of interest to the viewer. The identifying criteria 122 and/or 124 also provides a basis by which to associate the media content along the similarity continuum 118. The axis 120 can include only one of the selectable identifying criteria, or as in this example, can include two different identifying criteria. The first identifying criteria 122 ("Actors") is selectable to associate similar media content along the similarity continuum 118 in combination with a first direction 126 along the axis 120. The additional identifying criteria 124 ("Subject") is also selectable to associate similar media content along the similarity continuum 118 in combination with a second direction 128 along the axis 120.

Either of the identifying criteria 122 or 124 can be selected from any type of metadata, genre description, or other type of search criteria. For example, in addition to "Actors" and "Subject", the identifying criteria may be selected as "Violence", "Romance", "Comedy", "SciFi", or as any other type of identifying criteria associated with the content basis 114 and by which to identify other similar media content.

As a viewer moves the cursor 116 around the continuous selection graph 110, selectable indicators of similar media content are displayed. The right side of the graph 110 includes selectable indicators of media content that matches or is similar to the currently selected content basis 114, and that is associated with the identifying criteria 122 or 124. In this example, an indicator 130 of similar media content 132 indicates a "New Movie" that has a same actor and is similar to the selected content basis 114.

The selectable indicators can be individually displayed to indicate the relationship between the identifying criteria 122 or 124 and the similarity of the media content along the similarity continuum 118. A display of a selectable indicator along the curve of the continuous selection graph 110 can also provide a viewer with an indication as to how much of one category or the other the corresponding media content is most similar. For example, a movie that is listed in different categories, such as comedy and also drama, would show up in a media content search for either in a conventional search system. In the continuous selection graph 110, however, a viewer may select the identifying criteria as "Comedy" and "Drama" and the movie can be displayed so as to indicate whether it is more of a comedy or more of a dramatic movie.

A viewer can select an indicator of media content, such as the indicator 130, to either initiate the selected media content being rendered for display, or to initiate a display of a new continuous selection graph. When selected to locate other similar media content, the selected media content can then be the content basis for the new continuous selection graph along with preference parameters that conform to the new selection.

As the viewer moves the cursor 116 counterclockwise around the circle of the continuous selection graph 110, less similar media content selections are displayed (e.g., as based on the viewer selected identifying criteria 122 and 124, and the content basis 114). The similarity continuum 118 indicates media content that is progressively similar, and either more similar in a direction 134 or less similar in a direction 136 where media content selections are opposite of the selected movie (e.g., the content basis 114). The selectable indicators of similar media content are displayed to indicate a more similar relationship to the selected content basis 114 or a less similar relationship to the selected content basis 114. In addition, the displayed indications of similar media content provides a viewer with a granularity of results to know just how many other movies or programs are similar to the content basis 114.

In the example system 100, the client device 102 can be implemented as any one or combination of a television set-top box, a digital video recorder (DVR) and playback system, an appliance device, a gaming console, and/or as any other type of television client device or computing-based device that may be implemented in a television entertainment and information system. Additionally, client device 102 can be implemented with any number and combination of differing components as further described with reference to the example client device shown in FIG. 5. Client device 102 may also be associated with a user or viewer (i.e., a person) and/or an entity that operates the device such that a client device describes logical clients that include users, software, and/or devices.

In the example system 100, the client device 102 includes one or more processors 138 (e.g., any of microprocessors, controllers, and the like), media content inputs 140, and media content 142 (e.g., received media content or media content that is being received). The media content inputs 140 can include any type of communication interfaces and/or data inputs, such as Internet Protocol (IP) inputs over which streams of media content (e.g., IPTV media content) are received. Client device 102 can receive the media content 142 from any number of media content resources, such as from a content distributor via an IP-based network that is implemented as part of a system communication network.

The client device 102 also includes a recommendation system module 144 that can be implemented as computer-executable instructions and executed by the processors 138 to implement embodiments of continuous selection graphs. The recommendation system module 144 can be implemented to receive a viewer selection of the content basis 114, receive the content basis 114 from a recommendation source, and/or determine the content basis 114 from program viewing history. The recommendation system module 144 can also be implemented to then determine similar media content that is associated with the content basis 114 and with the identifying criteria 122 and 124.

Client device 102 can also include a program guide application 146 that processes program guide data from which a program guide can be rendered and displayed for viewing on display device 108. Additionally, client device 102 can include a search module 148 or application that can be implemented to receive a search request for media content when initiated by a viewer. The program guide application 146 and the search module 148 can also each be implemented as computer-executable instructions and executed by the processors 138. Additionally, the recommendation system module 144 may be implemented as an independent component, or as a component of either the program guide application 146 or the search module 148 to implement embodiments of continuous selection graphs.

Figure 2:
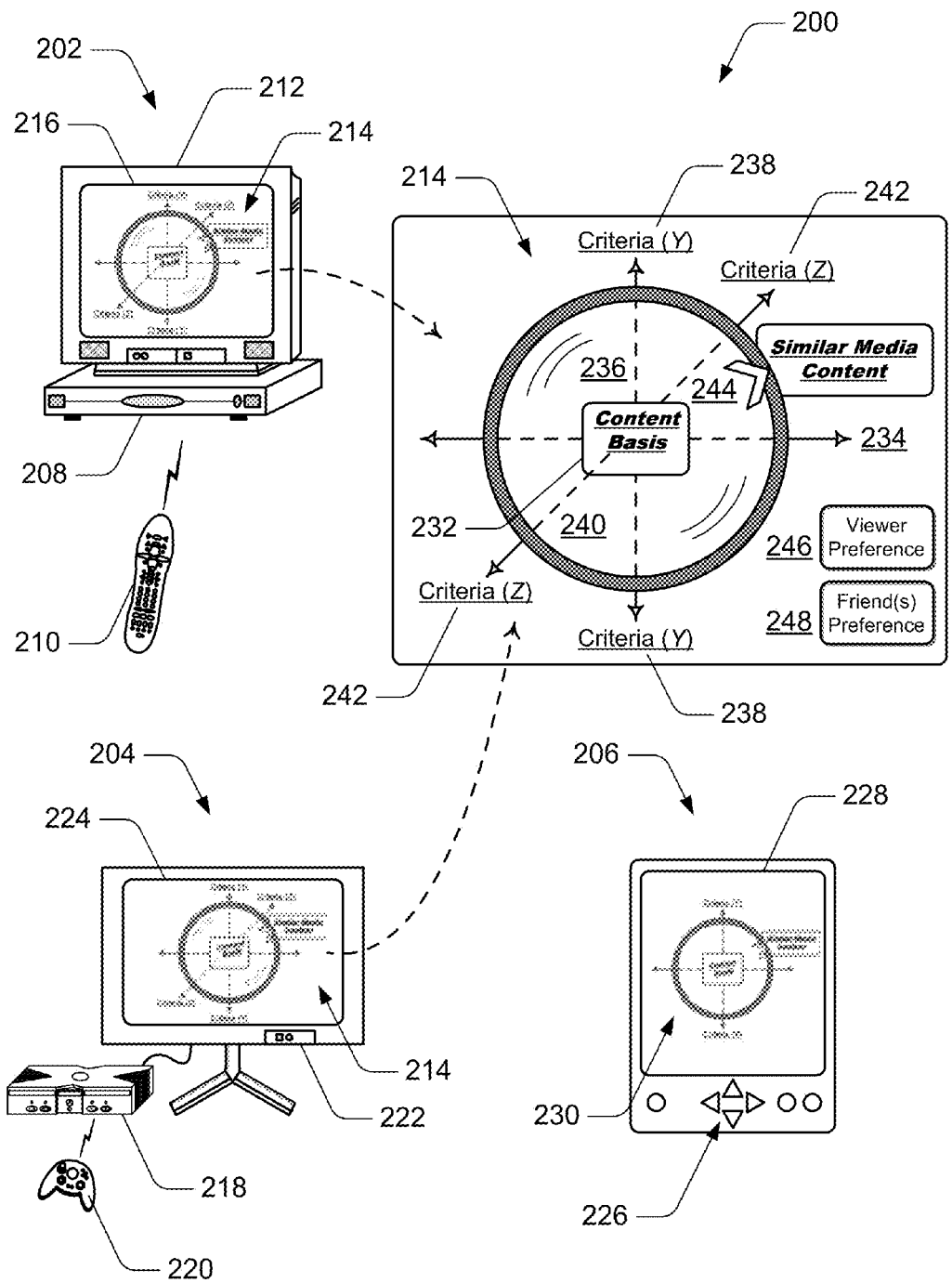
FIG. 2 illustrates other example systems in which embodiments of continuous selection graphs can be implemented.

FIG. 2 illustrates example systems 200 in which various embodiments of continuous selection graphs can be implemented. The example systems include television client system 202, a gaming system 204, and a portable device 206. The television client system 202 includes a client device 208, a remote input device 210, and a display device 212 having an embodiment of a continuous selection graph 214 displayed on a graphical user interface 216. The gaming system 204 includes a computer-based device 218 having a game controller 220 for user interaction with the gaming system. The example gaming system 204 also includes a display device 222 that displays the continuous selection graph 214 on a graphical user interface 224. The portable device 206 includes user-selectable controls 226 and an integrated display 228 on which an embodiment of a continuous selection graph 230 is displayed.

The television client device 208, computer-based device 218 of the gaming system, and the portable device 206 can each be implemented with one or more processors, a communication module, memory components, a media content rendering system, and a recommendation system module to implement embodiments of continuous selection graphs. Additionally, each of the devices can be configured for communication with any number of different content distributors to receive any type of media content and metadata (e.g., identifying criteria for a continuous selection graph). Further, any of the devices can be implemented with any number and combination of differing components as further described with reference to the example client device shown in FIG. 5.

In this example, the continuous selection graph 214 is a spherical graph implemented similar to the continuous selection graph 110 shown in FIG. 1. However, the spherical graph 214 also includes at least an additional axis of additional identifying criteria from which to further determine or locate media content that is similar to a content basis 232. The continuous selection graph 214 includes a similarity continuum 234 (e.g., in the "x" plane), an axis 236 of identifying criteria 238 (e.g., criteria in the "y" plane), and an axis 240 of identifying criteria 242 (e.g., criteria in the "z" plane). The spherical continuous selection graph 214 is formed by the at least three axis, and the identifying criteria of the axis form the basis by which to associate media content along the similarity continuum 234.

A viewer can move a cursor 244 around the sphere of the continuous selection graph 214 with user inputs via selectable controls of the remote input device 210 and/or the game controller 220. As the cursor 244 is moved around or through the sphere, other movies or media content that is closer to or farther away from the currently selected content basis 232 become selectable in the graph 214.

In an embodiment, the content basis 232 can be selected or initiated as a viewer preference, as preferences from friends, or as a combination thereof. The content basis 232 can also be changed or added to by moving preference selectors 246 and/or 248 to the center of the continuous selection graph 214. For example, a viewer can add a friend's preferences to the viewer's preferences by moving the friend's preference selector 248 into the center of the spherical graph 214 and the two sets of preferences will blend together. The graph can then change to display similar media content that reflects the combination of preferences which are combined to form the content basis 232.

This type of content basis selection can be implemented for any type or style of data, such as to find similar media content, restaurants, theaters, sporting events, and the like. For example, the portable device 206 can be implemented as a navigation system device that organizes a complex matrix of data into the continuous selection graph 230 by which a traveler can locate the restaurants, theaters, gas stations, and the like.

Figure 3:
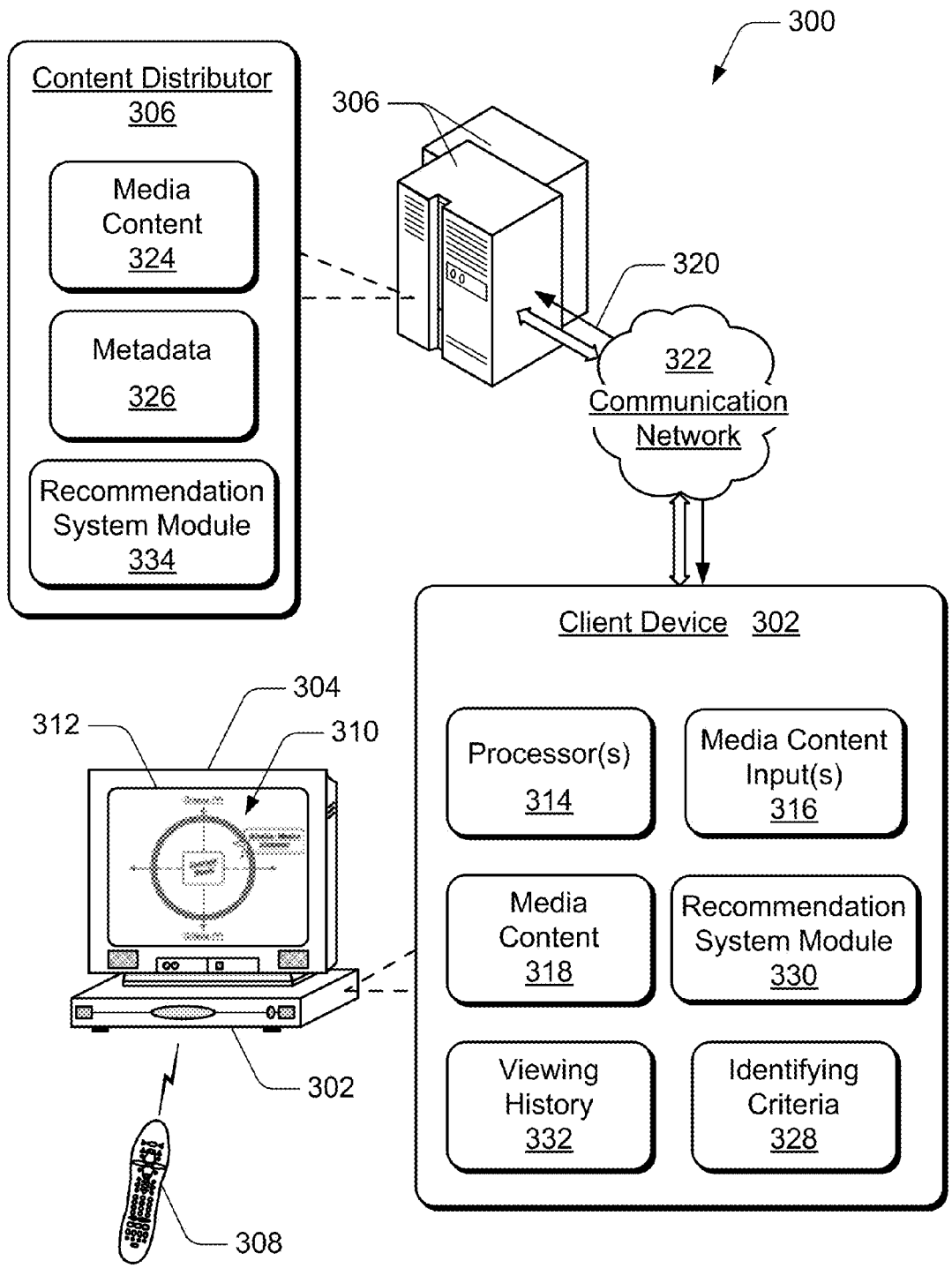
FIG. 3 illustrates another example system in which embodiments of continuous selection graphs can be implemented.

FIG. 3 illustrates an example system 300 in which various embodiments of continuous selection graphs can be implemented. In this example, system 300 includes a television client device 302, a display device 304, content distributors 306, and an input device 308, such as a television remote control. An embodiment of a continuous selection graph 310 is displayed on a graphical user interface 312 of the display device 304. The client device 302 can be implemented with any number and combination of differing components as further described with reference to the example client device shown in FIG. 5.

In this example system 300, client device 302 includes one or more processors 314, media content inputs 316, and media content 318 (e.g., received media content or media content that is being received). The media content inputs 316 can include any type of communication interfaces and/or data inputs, such as Internet Protocol (IP) inputs over which streams of media content (e.g., IPTV media content) are received. Client device 302 can receive the media content 316 from any one or combination of content distributors 306 via an IP-based network 320.

The IP-based network 320 can be implemented as part of a communication network 322 that facilitates media content distribution and data communication between the content distributors 306 and any number of client devices, such as client device 302. The communication network 322 can be implemented as part of a media content distribution system using any type of network topology and/or communication protocol, and can be represented or otherwise implemented as a combination of two or more networks. The television client device 302 is configured for communication with the content distributors 306 via the IP-based network 320 and/or the communication network 322.

The content distributor 306 can communicate or broadcast media content 324 to any number of television client devices as an IPTV multicast via the IP-based network 320 and/or the communication network 322. The content distributor 306 can also provide metadata 326 that corresponds to the media content 324. The client device 302 can receive the metadata 326 from the content distributor 306 as the identifying criteria 328 for the continuous selection graph 310 displayed on display device 304. The client device 302 includes a recommendation system module 330 that implements the various embodiments of continuous selection graphs as described herein. The client device 302 also includes a viewing history 332 from which the recommendation system module 330 can determine a content basis for the continuous selection graph 310.

In an alternate embodiment of the example system 300, the content distributor 306 can include a recommendation system module 334 rather than, or in addition to, the recommendation system module 330 implemented in client device 302. The recommendation system module 334 can implement embodiments of continuous selection graphs as a network-based feature.

Generally, any of the functions, methods, and modules described herein can be implemented using hardware, software, firmware (e.g., fixed logic circuitry), manual processing, or any combination thereof. A software implementation of a function, method, or module represents program code that performs specified tasks when executed on a computing-based processor. Example method 400 described with reference to FIG. 4 may be described in the general context of computer-executable instructions. Generally, computer-executable instructions can include applications, routines, programs, objects, components, data structures, procedures, modules, functions, and the like that perform particular functions or implement particular abstract data types.

The methods may also be practiced in a distributed computing environment where functions are performed by remote processing devices that are linked through a communications network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 4:
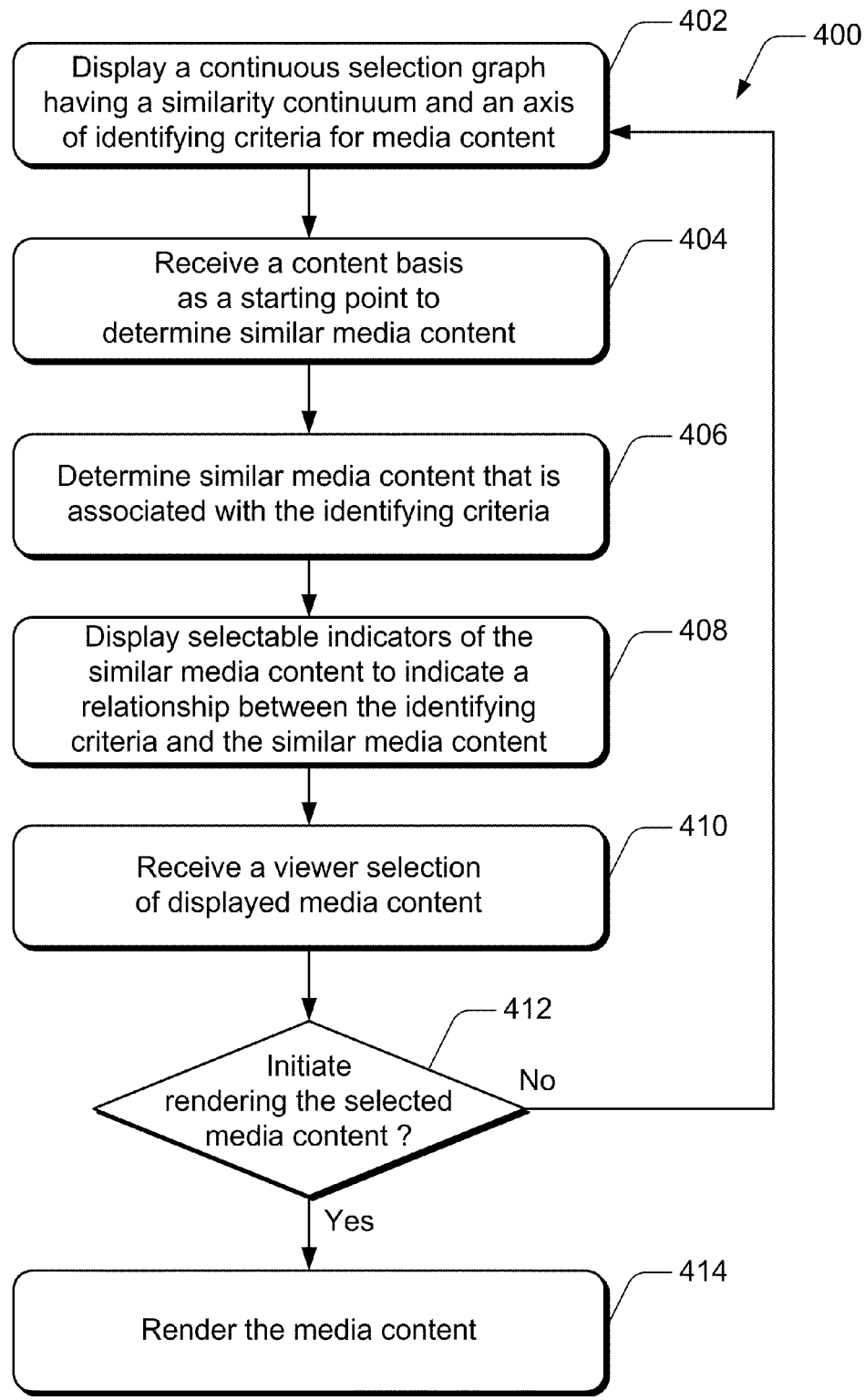
FIG. 4 illustrates example method(s) for continuous selection graphs in accordance with one or more embodiments.

FIG. 4 illustrates example method(s) 400 of continuous selection graphs. The order in which the method is described is not intended to be construed as a limitation, and any number of the described method blocks can be combined in any order to implement the method, or an alternate method.

At block 402, a continuous selection graph is displayed having a similarity continuum and an axis of identifying criteria for media content. For example, continuous selection graph 110 (FIG. 1) is displayed on display device 108 and includes the similarity continuum 118 which indicates media content that is progressively similar. The continuous selection graph 110 also includes an axis 120 of identifying criteria 122 and 124 by which to associate media content along the similarity continuum 118.

In an embodiment, the continuous selection graph 110 is circular and displayed such that the axis 120 of the identifying criteria 122 and 124 is perpendicular to the similarity continuum 118. For the circular graph 110, the similarity continuum 118 horizontally intersects the circular graph and the axis 120 vertically intersects the circular graph. In an alternate embodiment, a continuous selection graph 214 (FIG. 2) includes a similarity continuum 234 (e.g., in the "x" plane), an axis 236 of identifying criteria 238 (e.g., criteria in the "y" plane), and an axis 240 of identifying criteria 242 (e.g., criteria in the "z" plane). The spherical continuous selection graph 214 is formed by the at least three axis.

At block 404, a content basis is received as a starting point to determine similar media content. For example, the continuous selection graph 110 includes a content basis 114 which can be received as any one or combination of a viewer selection, a recommendation system selection, a determination from a viewing history of the viewer (or viewers), or as any other type of starting point from which similar media content can be determined.

At block 406, similar media content that is associated with the identifying criteria is determined. For example, in the continuous selection graph 110, the similar media content 132 is determined from the content basis 114 in association with the identifying criteria 122. At block 408, selectable indicators of the similar media content are displayed to indicate a relationship between the identifying criteria and the similar media content. For example, the similar media content 132 is displayed as a selectable indicator 130 to indicate the relationship between the identifying criteria 122 and the similar media content 132 along the similarity continuum 118. The selectable indicator 130 can also be displayed to indicate that the similar media content 132 has either a more similar relationship to the content basis 114 or a less similar relationship to the content basis 114.

At block 410, a viewer selection of displayed media content is received, and at block 412, a determination is made as to whether the viewer selection is to initiate rendering the selected media content. For example, a viewer at client device 102 can select an indicator of similar media content, such as indicator 130, to either initiate the selected media content being rendered for display, or to initiate a display of a new continuous selection graph. If the viewer selection is received to initiate rendering the selected media content (i.e., "Yes" from block 412), then the selected media content is rendered at block 414 (such as a movie or television program for viewing). If the viewer selection is not received to initiate rendering the selected media content (i.e., "No" from block 412), then the method continues at block 402 to display a new continuous selection graph where the selected media content is the content basis for the new continuous selection graph.

Figure 5:
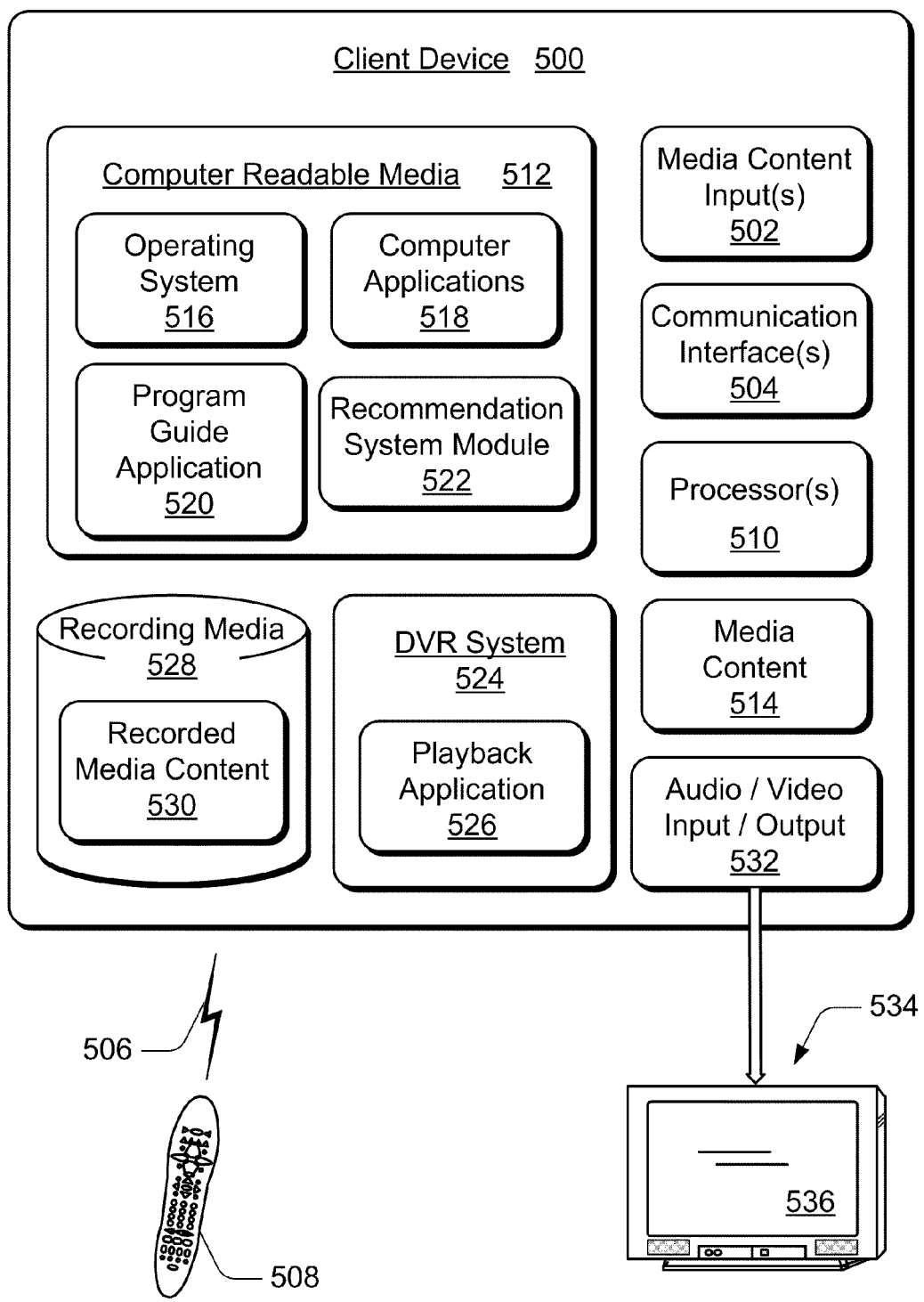
FIG. 5 illustrates various components of an example client device which can implement embodiments of continuous selection graphs.

FIG. 5 illustrates various components of an example client device 500 that can be implemented as any form of a computing, electronic, appliance, or television client device to implement embodiments of continuous selection graphs. For example, client device 500 can be implemented as the television client device 102 shown in FIG. 1, and/or as the client device 302 or the content distributor 306 shown in FIG. 3. The example client device 500 can also be implemented as the client device 208, the computer-based device 218, or as the portable device 206 shown in FIG. 2. In various embodiments, client device 500 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Client device 500 includes one or more media content inputs 502 that may include Internet Protocol (IP) inputs over which streams of media content are received via an IP-based network. Client device 500 further includes communication interfaces 504 that can be implemented as any one or more of a serial and/or parallel interface, a wireless interface, any type of network interface, a modem, and as any other type of communication interface. A network interface provides a connection between client device 500 and a communication network by which other electronic and computing devices can communicate data with device 500.

Similarly, a serial and/or parallel interface provides for data communication directly between client device 500 and the other electronic or computing devices. A modem also facilitates communication with other electronic and computing devices via a conventional telephone line, a DSL connection, cable, and/or other type of connection. A wireless interface enables client device 500 to receive control input commands 506 and other information from an input device, such as from remote control device 508, a portable computing-based device (such as a cellular phone), or from another infrared (IR), 802.11, Bluetooth, or similar RF input device.

Client device 500 also includes one or more processors 510 (e.g., any of microprocessors, controllers, and the like) which process various computer-executable instructions to control the operation of device 500, to communicate with other electronic and computing devices, and to implement embodiments of continuous selection graphs. Client device 500 can be implemented with computer-readable media 512, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 512 provides data storage mechanisms to store media content 514 as well as other information and/or data such as software applications and any other types of information and data related to operational aspects of client device 500. For example, an operating system 516 and/or other computer applications 518 can be maintained as software applications with the computer-readable media 512 and executed on processors 510 to implement embodiments of continuous selection graphs.

The computer applications can include a program guide application 520 and/or a recommendation system module 522 for a client device or content distributor that implements embodiments of continuous selection graphs. The recommendation system module 522 is shown as a software module in this example to implement various embodiments of continuous selection graphs as described herein. Examples of the recommendation system module 522 are described with reference to the recommendation system module 144 as shown in FIG. 1, and with reference to the recommendation system modules 330 and 334 shown in FIG. 3.

When implemented as a television client device, the example client device 500 can also include a DVR system 524 with playback application 526, and recording media 528 to maintain recorded media content 530 that client device 500 receives and/or records. The recorded media content 530 can include the media content 514 that is received from a content distributor and recorded. For example, the media content 514 can be recorded when received as a viewer-scheduled recording, or when the recording media 528 is implemented as a pause buffer that records the media content 514 as it is being received and rendered for viewing.

Further, client device 500 may access or receive additional recorded media content that is maintained with a remote data store (not shown). Client device 500 may also receive media content from a video-on-demand server, or media content that is maintained at a broadcast center or content distributor that distributes the media content to subscriber sites and client devices. The playback application 526 can be implemented as a video control application to control the playback of media content 514, the recorded media content 530, and/or other video on-demand media content, music, and any other audio, video, and/or image media content which can be rendered and/or displayed for viewing.

Client device 500 also includes an audio and/or video output 532 that provides audio and/or video data to an audio rendering and/or display system 534. The audio rendering and/or display system 534 can include any devices that process, display, and/or otherwise render audio, video, and image data. Video signals and audio signals can be communicated from client device 500 to a display device 536 via an RF (radio frequency) link, S-video link, composite video link, component video link, DVI (Digital Video Interface), HDMI (High Definition Multimedia Interface), analog audio connection, or other similar communication link. Alternatively, the audio rendering and/or display system 534 can be implemented as integrated components of the example client device 500.

Although embodiments of continuous selection graphs have been described in language specific to features and/or methods, it is to be understood that the subject of the appended claims is not necessarily limited to the specific features or methods described. Rather, the specific features and methods are disclosed as example implementations of continuous selection graphs.

The invention claimed is:

1. A method implemented by a computing device that is configured as a client device and corresponding display device, the method comprising:
    displaying a continuous selection graph as a circular graph on the display device, the continuous selection graph including a similarity continuum axis that horizontally intersects the circular graph to indicate media content that is progressively similar, and including an axis of identifying criteria for the media content; and displaying the axis of identifying criteria for the media content by which to associate the media content along the similarity continuum axis, the axis of identifying criteria vertically intersects the circular graph perpendicular to the similarity continuum axis.

2. A method as recited in claim 1, further comprising determining similar media content that is associated with identifying criteria on the axis of identifying criteria, wherein selectable indicators of the similar media content are individually displayed to indicate the relationship between the identifying criteria and the similarity of the media content along the similarity continuum axis.

3. A method as recited in claim 2, wherein the similar media content is determined from a content basis in association with the identifying criteria.

4. A method as recited in claim 3, further comprising displaying the selectable indicators of the similar media content to indicate at least one of a more similar relationship to the content basis or a less similar relationship to the content basis.

5. A method as recited in claim 3, further comprising receiving the content basis as at least one of a viewer selection, a recommendation system selection, or as a determination from a viewing history.

6. A method as recited in claim 2, further comprising receiving a viewer selection of a similar media content, and displaying a new continuous selection graph comprising the selected similar media content as a content basis for the new continuous selection graph.

7. A method as recited in claim 2, wherein the axis of identifying criteria includes additional identifying criteria of the media content, the identifying criteria being selectable to associate the similar media content along the similarity continuum axis in combination with a first direction along the axis of identifying criteria, and the additional identifying criteria being selectable to associate the similar media content along the similarity continuum axis in combination with a second direction along the axis of identifying criteria.

8. A method as recited in claim 1, wherein the continuous selection graph is displayed to further include at least an additional axis corresponding to additional identifying criteria of the media content, the continuous selection graph being displayed as a spherical graph.

9. A client system, comprising:
a display device configured to display a graphical user interface as a circular continuous selection graph which includes a similarity continuum axis to indicate media content that is progressively similar, and includes an axis of identifying criteria for the media content by which to associate the media content along the similarity continuum axis, the similarity continuum axis horizontally intersecting the circular continuous selection graph, and the axis of identifying criteria perpendicularly intersecting the similarity continuum axis and vertically intersecting the circular continuous selection graph; and
the circular continuous selection graph further includes a display of the media content that are each associated with identifying criteria on the axis of identifying criteria, and displayed to indicate a relationship between the identifying criteria and the similarity of the media content.

10. A client system as recited in claim 9, wherein the media content is displayed to indicate at least one of a more similar relationship to a selected content basis or a less similar relationship to the selected content basis.

11. A client system as recited in claim 10, further comprising a recommendation system module configured to at least one of receive the selected content basis as a viewer selection or determine the selected content basis from a viewing history.

12. A client system as recited in claim 9, wherein the axis of the identifying criteria perpendicularly intersects the similarity continuum axis within the circular graph.

13. A client system as recited in claim 9, wherein the circular continuous selection graph is displayable as a spherical graph that includes at least an additional axis corresponding to additional identifying criteria of the media content.

14. A client system as recited in claim 9, wherein similar media content is associated with the identifying criteria, and wherein selectable indicators of the similar media content are individually displayed to indicate the relationship between the identifying criteria and the similarity of the media content along the similarity continuum axis.

15. A media content service, comprising:
one or more media content servers configured to distribute media content to client devices;
a recommendation system module configured to:
generate a continuous selection graph for display at a client device as a circular graph, the continuous selection graph including a similarity continuum that horizontally intersects the circular graph to indicate the media content that is progressively similar, and including an axis of identifying criteria for the media content by which to associate the media content along the similarity continuum, the axis of identifying criteria vertically intersects the circular graph perpendicular to the similarity continuum; and
determine similar media content that is associated with identifying criteria on the axis of identifying criteria, the continuous selection graph including selectable indicators of the similar media content to indicate a relationship between the identifying criteria and the similar media content.

16. A media content service as recited in claim 15, wherein the media content includes at least one of television programs, movies, video, digital images, contacts, or music.

17. A media content service as recited in claim 15, wherein the recommendation system module is further configured to determine the similar media content from a content basis in association with the identifying criteria.

18. A media content service as recited in claim 17, wherein the selectable indicators of the similar media content are generated for display on the continuous selection graph to indicate at least one of a more similar relationship to the content basis or a less similar relationship to the content basis.

19. A media content service as recited in claim 15, wherein the recommendation system module is further configured to receive a viewer selection of a similar media content from the client device and generate a new continuous selection graph for display at the client device, the new continuous selection graph including the selected similar media content as a content basis for the new continuous selection graph.

20. A media content service as recited in claim 15, wherein the recommendation system module is further configured to generate the continuous selection graph to include at least an additional axis corresponding to additional identifying criteria for the media content, the continuous selection graph being displayable at the client device as a spherical graph.

* * * * *